United States Patent
Bradley et al.

(10) Patent No.: US 8,751,532 B2
(45) Date of Patent: Jun. 10, 2014

(54) NOMADIC DATA COLLECTION AND MANAGEMENT METHOD INCLUDING PESSIMISTIC LOCKING OF DATA

(75) Inventors: Curtis Allen Bradley, Alpharetta, GA (US); James Erich Casper, Fuquay-Varina, NC (US); Teodorico J. Harrisson, Alpharetta, GA (US); Noah Henry Newman, Jr., Marietta, GA (US); Jennifer D. Rae, Orange Park, FL (US); Paul Kuo-An Tung, Lilburn, GA (US)

(73) Assignee: International Business Machines Corporation, Armonk, NY (US)

( * ) Notice: Subject to any disclaimer, the term of this patent is extended or adjusted under 35 U.S.C. 154(b) by 2378 days.

(21) Appl. No.: 11/432,071

(22) Filed: May 11, 2006

(65) Prior Publication Data
US 2007/0266030 A1  Nov. 15, 2007

(51) Int. Cl.
*G06F 7/00* (2006.01)
*G06F 17/30* (2006.01)

(52) U.S. Cl.
USPC .......................................... 707/781; 707/784

(58) Field of Classification Search
USPC .............. 707/201, 5, 8, 104.1, 200, 203, 705, 707/781, 783, 784, 792
See application file for complete search history.

(56) References Cited

U.S. PATENT DOCUMENTS

| | | | | |
|---|---|---|---|---|
| 5,272,752 | A | 12/1993 | Myers et al. | 380/23 |
| 5,537,467 | A | 7/1996 | Cheng et al. | 379/211 |
| 5,752,244 | A * | 5/1998 | Rose et al. | 707/5 |
| 5,809,503 | A * | 9/1998 | Aoshima | 707/8 |
| 5,931,947 | A | 8/1999 | Burns et al. | 713/201 |
| 6,393,484 | B1 | 5/2002 | Massarani et al. | 709/227 |
| 6,636,894 | B1 | 10/2003 | Short et al. | 709/225 |
| 6,684,438 | B2 | 2/2004 | Brodersen et al. | 707/201 |
| 6,711,593 | B1 | 3/2004 | Gordon et al. | 707/204 |
| 6,725,219 | B2 | 4/2004 | Nelson et al. | 707/10 |
| 7,139,812 | B2 * | 11/2006 | Dozier et al. | 709/218 |

(Continued)

FOREIGN PATENT DOCUMENTS

JP    11175468 A2    7/1997

OTHER PUBLICATIONS

"Graphical Network Analyzer". IBM technical Disclosure Bulletin, vol. 36, No. 12, Dec. 1993, pp. 473-480.

*Primary Examiner* — Md. I Uddin
(74) *Attorney, Agent, or Firm* — John R. Pivnichny; Law Office of Jim Boice

(57) ABSTRACT

A method of managing a central data repository including updating the central data repository from a disconnected nomadic device by receiving a request from a first nomadic device for access at the central data repository, authorizing the first nomadic device and sending a check out template to the first nomadic device. The server receives a checkout selection from the first nomadic device, authenticates the first nomadic device, and presents a list of authorized items to the first nomadic device; receives a request for selected items from the list and check out the selected items to the first nomadic device. This prohibits other nomadic devices from checking out the selected items checked out to the first selected nomadic device. The first nomadic device is disconnected and the checked out selected items are updated. After updating, a check in request is received at the central data repository from the first nomadic device for the updated checked out selected items The device is and authenticated and authorized, and the updated checked out selected items are returned to the central data repository.

10 Claims, 4 Drawing Sheets

(56) References Cited

U.S. PATENT DOCUMENTS 7,543,047 B2 * 6/2009 Park et al. .................... 709/221
2003/0135507 A1 * 7/2003 Hind et al. .................... 707/100
2005/0235012 A1 * 10/2005 Harry et al. .................... 707/203
2007/0198477 A1 * 8/2007 Lawton et al. .................... 707/3

* cited by examiner

NOMADIC DATA COLLECTION AND MANAGEMENT METHOD INCLUDING PESSIMISTIC LOCKING OF DATA

BACKGROUND

1. Field of the Invention

The invention relates to management of distributed database data in a nomadic data collection system, including file access and retrieval, from a centralized data repository by a disconnected nomadic work station. A further aspect of the invention is the management of data coherency, including backing up database information and files, file migration between disconnected work stations, and a high density data repository.

2. Background Art

Nomadicity is the term used to define the transparent, integrated and convenient form of system support needed to provide a rich set of computing and communications capabilities and services to nomads, including either or both of nomadic workers or nomadic workstations, as they move from place to place. Nomadic data collection specifically allows for data packets to be transferred between a generally disconnected workstation and a central repository.

When updating central data repositories which are not easily accessed, nomadic data collection is employed to facilitate the gathering of information from normally disconnected devices. Nomadic data collection also allows for adding data to a central repository, capturing what exists without regard to or awareness of what already existed.

In this context a need exists to update central repositories of data which are not easily accessed via a direct connection, that is, nomadic data collection.

SUMMARY OF THE INVENTION

The method, system, and program product described herein allow updating central data repositories where the repositories are not easily accessed via a direct connection, that is, where some form of nomadic data collection is required. Nomadic data collection allows gathering new information that alters existing information while in a disconnected state. To enable nomadic data collection, the method, system, and program product pessimistically check out available data from the database, and make it available to an individual device, such as a personal computer while in a connected state, where alterations can be made in a subsequent disconnected state.

Nomadic data collection with pessimistic data check out allows users and devices not continuously connected to a central repository to indicate that they are working with specific seta of data within a repository and enables the addition of new items of data and the update of existing items of data. Nomadic data collection has heretofore been associated with dedicated devices. By way of contrast, the method, system, and program product can be used with general purpose devices.

The method, system, and program product described herein allow for an individual or device to use an already existing data set while preventing others from substantially simultaneously updating the same set of data. This is particularly appropriate to manage large volumes of data.

One aspect of the invention is a method of managing a central data repository including updating the central data repository from a disconnected device. By "central data repository" we include the actual data server, the database management system, and the associated nomadic data communications servers. The first step in this method is the central data repository receiving a request from a first device for access to the data. The central data repository authorizes access to the first device and sends a check out template to the first device. The repository receives back a checkout selection from the first device, authenticates the first device, and presents a list of authorized items to the first device. The repository receives the request for selected items from the list and checks out the selected items to the first device, that is, the repository grants access to the data item and may serve an electronic data entry form to the first device, while simultaneously prohibiting other devices from checking out the same selected items that have been checked out to the first selected device. After checking out the items, the first device disconnects from the repository. The now disconnected first device updates the checked out selected items. After the disconnected device has completed updating the checked out data items, it transmits a check in request to the central data repository. The central repository authenticates the requester and requester, and authorizes the first device to connect and transmit the checked out data, and loads the now updated, checked out selected items back to the central data repository.

FIGURES

The above and other features of the invention, including various novel details of construction and combination of parts and processes, will now be more particularly described with reference to the accompanying drawings and pointed out in the claims. It will be understood that the particular nomadic data collection method and system embodying the invention is shown by way of illustration only and not as a limitation of the invention. The principles and features of this invention may be employed in varied and numerous embodiments without departing from the scope of the invention.

DETAILED DESCRIPTION

Figure 1:
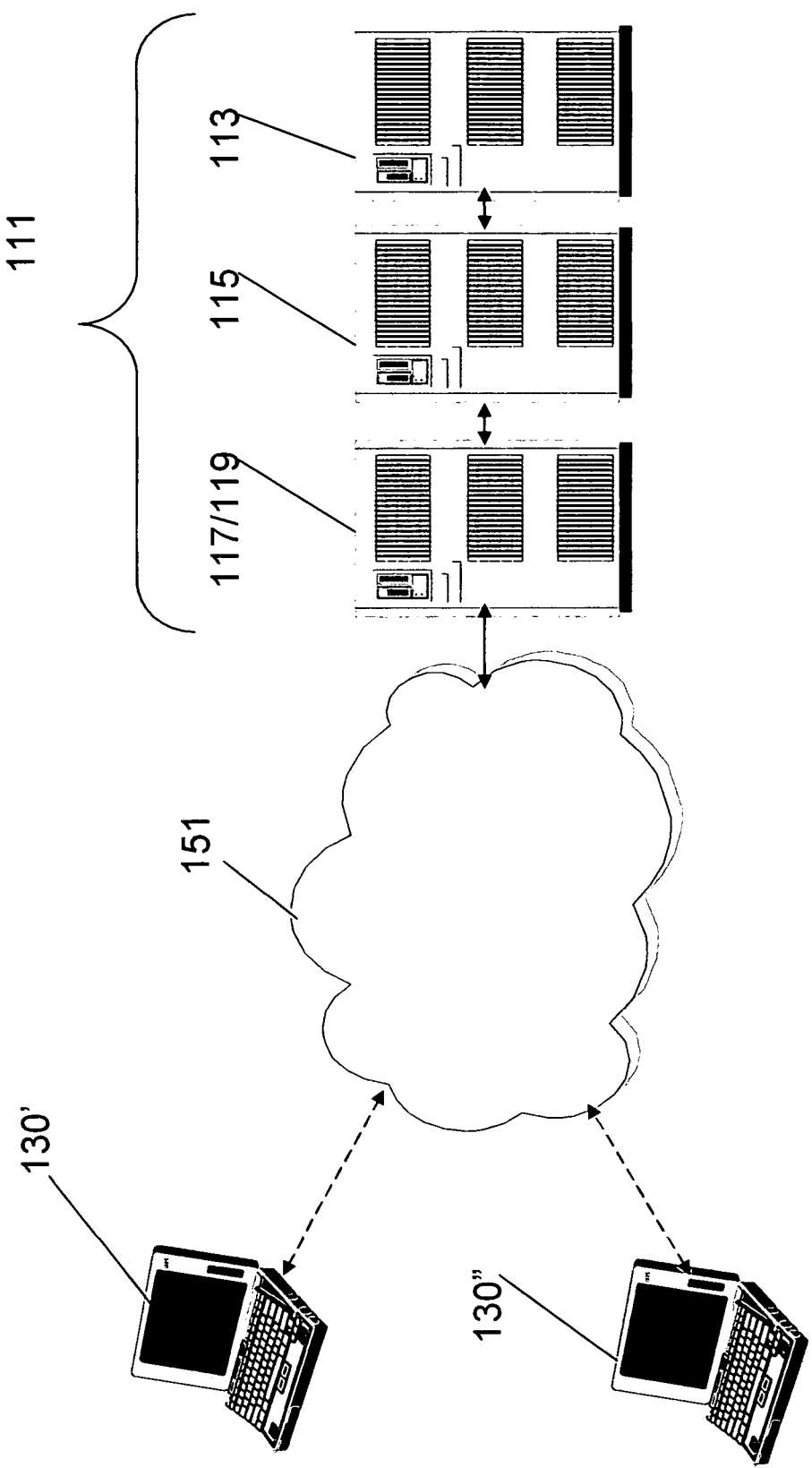
FIG. 1 illustrates a simplified overview of a discontinuously connected network used in nomadic data collection and management with which pessimistic locking of data is advantageous.

The method, system, and program product described herein allow for a nomad user, i.e., an individual or device to use already existing data elements while preventing others from substantially simultaneously updating the same data element. This is particularly appropriate to managing large volumes of data.

The disclosed invention is a method, system, and program product that facilitates common access of a central data repository through pessimistic locking of dynamically accessible data with defined data collection and data management groups, where transactional data and not control data is promulgated. Specifically, the method, system, and program described herein pessimistically locks in the central repository by devices that have moved data from the central repository to the local systems for adding, updating, and deleting data, and then moving the data back to the central repository and unlocking the data on the central repository. The method, system, and program product allow systems that are not continuously connected to the central repository, that is, they are discontinuously connected to the central repository, to indicate that they are working with specific items of data locally. The data remains locked while the remote system is accessing the data and working with the data.

One aspect of the invention is a method of managing a central data repository 111 including updating the central data repository 111 from a disconnected device 130. By "central data repository" 111 we include the actual data server 113, the database management system 115, and the communications servers 117 for communicating with the associated nomadic data communications devices 130.

The first step in this method is the central data repository 111 receiving a request from a first nomadic device 130 for access to the data. The central data repository 111 authorizes access to the first device 130 and sends a check out template to the first nomadic device 130. The repository 111 receives back a checkout selection from the first nomadic device 130, authenticates the first nomadic device 130, and presents a list of authorized items to the first nomadic device 130. The repository 111 receives the request for selected items from the list and checks out the selected items to the first nomadic device 130 while simultaneously prohibiting other devices from checking out the same selected items that have been checked out to the first selected nomadic device 130. After checking out the items, the first nomadic device disconnects from the repository 111. The now disconnected first nomadic device 130 updates the checked out selected items. After the disconnected nomadic device 130 has completed updating the checked out data items, it transmits a check in request to the central data repository 111. The central repository 111 authenticates and authorizes the first nomadic device 130 to connect and transmit the checked out data, and return the now updated, checked out selected items back to the central data repository 111.

FIG. 1 is a high level illustration of a nomadic data collection system, including a central data repository 111 and one or more remote devices 130', 130", connected through, for example, a wireless LAN 151, an internet connecting wireless devices, or the like. The data repository 111 includes a database server 113, a database management system 115, an authentication server 117, and a communications front end 119.

Figure 2:
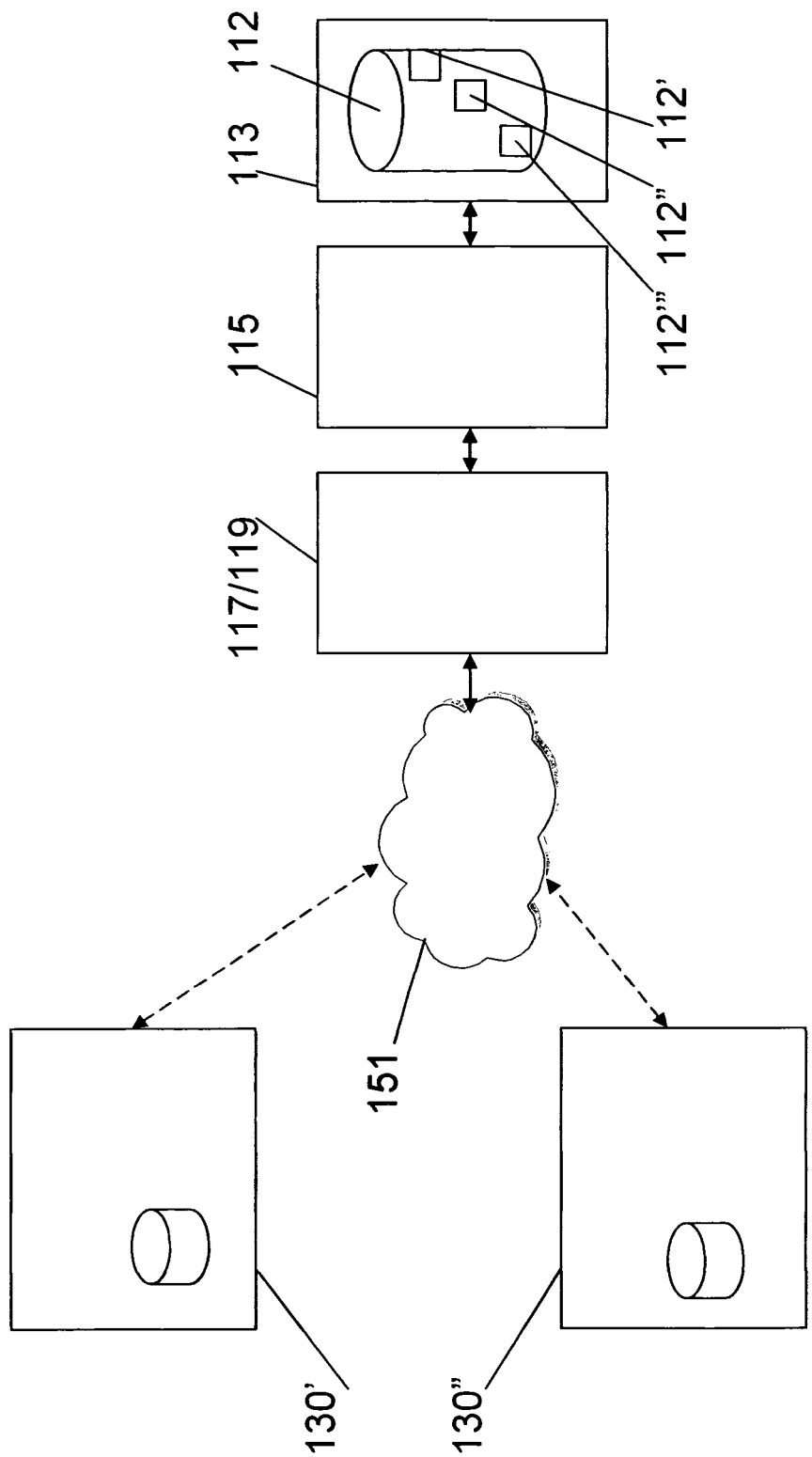
FIG. 2 is a schematic block diagram of a nomadic data collection database system in accordance with the invention.

FIG. 2 is a schematic block diagram of a nomadic data collection database system in accordance with the invention. As illustrated, there is a data repository 111 and a plurality of client nodes 130', 130", each of which has a unique node identifier. The data repository 111 includes at least one processing core, shown as server 113, comprising a processor and memory for accessing and maintaining a central database 112. Preferably, the central database 112 is a relational database such as, for example, DB2 available from IBM Corporation.

Each client node 130', 130" can be a desktop or portable computer, each having at least one processing core which can include a processor and memory. Each client node 130', 130" accesses and maintains a respective local replicated database, each of which is replicated from selected ("checked out") records from the central database 112. As such, each of the client local databases corresponds to a respective subset 112', 112", 112''' of the central database 112.

As illustrated, server database subsets 112', 112", 112''' can overlap so that an individual data element in the server database 112 can be present at a plurality of client databases. Each of the client local databases can also include additional data fields which are not related to data fields in the central database 112.

In a particular preferred embodiment of the invention, the client-side databases include tabular data which conforms to the Open Database Connectivity (ODBC) standard. Examples of suitable commercial products include database products such as IBM DB2, Microsoft Access, Watcom SQL, and Personal Oracle and spreadsheet products such as Microsoft Excel. Other tabular data storage structures can also be used at the client.

The data repository 111 can preferably store data for all clients and support multiple simultaneous users, e.g., a mainframe computer or computer cluster. The nomadic device client nodes 130', 130" are preferably autonomous personal computers, such as laptop or hand-held computers, a PDA, or even a smart cellular telephone, which intermittently communicate with the data repository 111 through a communications network 151, such as a LAN, a wireless LAN, a BlueTooth node, a telephone network, or the like. In general, although not required, the databases on the server and clients are heterogeneous.

As such the server cannot generally control the database semantics and operations at the clients. Furthermore, the server cannot rely on knowledge of the database logic at the clients.

As illustrated, each of the nomadic device client nodes 130', 130", 130''' can establish a respective communication link with the communications network 151, which is linked to the data repository 111. The communications link 151 can be made up of analog or digital links, and can be hard wire, wireless, or optical. To that end, each node includes a respective data transceiver such as an analog modem, a cellular modem, a digital (e.g., ISDN) modem, or an infrared (IR) transceiver.

Over time, the central database 112 can be modified by users to insert, update and delete rows, columns and data fields. These modifications to the central database 112 can be accomplished by users at the server or by users at one or more of the nomadic client nodes 130. Similarly, a user at a particular nomadic client node 130 can also modify the client local database over time by inserting, updating and deleting data fields.

Figure 3:
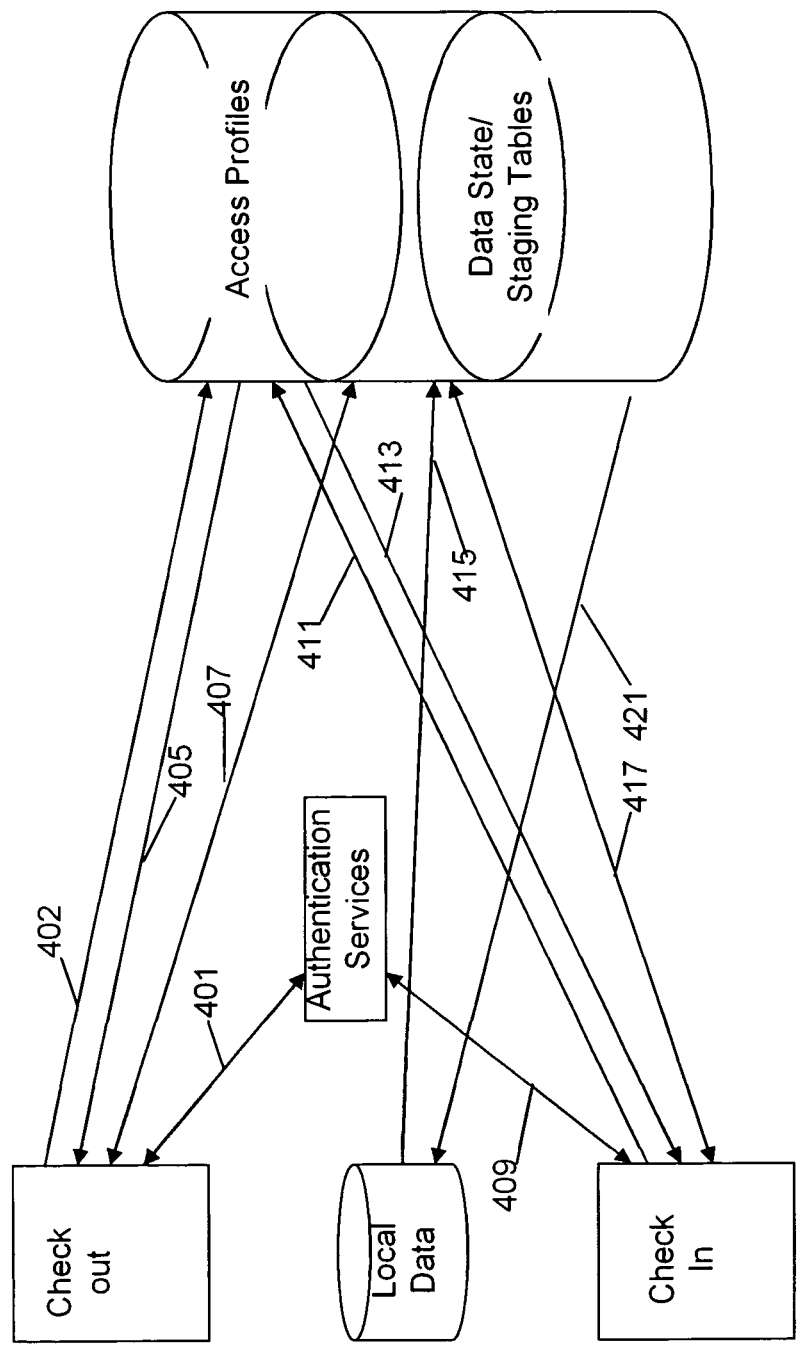
FIG. 3 is a schematic diagram illustrating data zones and data access tokens between local system(s) arenas and secure/central/systems arenas, including check-in and check-out between discontinuously connected network elements in nomadic data collection and management where pessimistic data locking is utilized.

FIG. 3 is a schematic diagram illustrating data zones and data access tokens between local system(s) arenas and secure/central/systems arenas, including check-in and check-out between discontinuously connected network elements in nomadic data collection and management where pessimistic data locking is utilized.

The method shown in FIG. 3 allows a user to check out, i.e., publish, data which the user is authorized to access, as well as to check in, i.e., load, data which the user has previously checked out and changed or initially gathered. The access authorization provisions secures core client data from direct manipulation.

Figure 4:
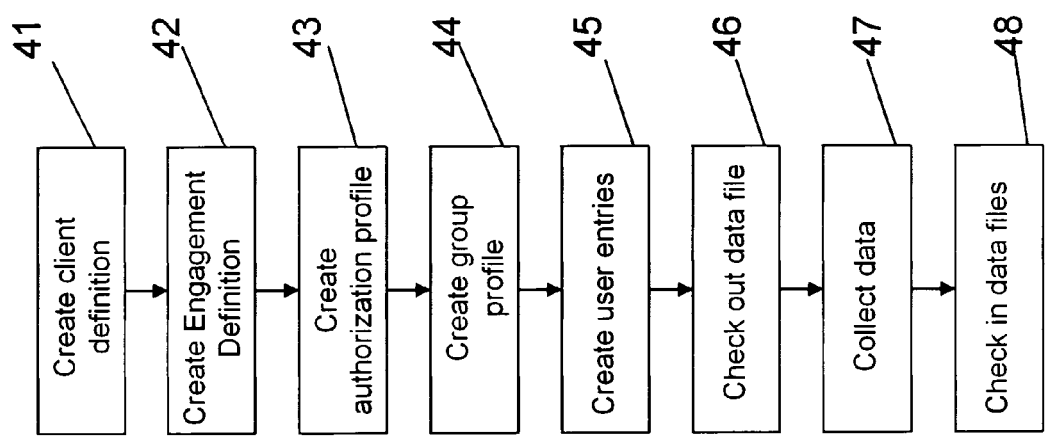
FIG. 4 is a high level flow chart of one method of the invention.

The flow chart of FIG. 4 illustrates on embodiment of the invention. As part of the authorization process, a client definition is created or called 41, and an engagement definition is created 42 which is tied to a specific end user or client. Authorization profiles are created 43 which are tied to specific engagements, and group profiles are created 44 which are assigned specific authorization profiles within a single engagement. User entries are created 45 and are assigned to specific groups, where it is possible for a single user to belong to more then one group.

This is followed by a checkout 46 which may consist of (i) locking other users out of the specific data file served to the nomadic device while (ii) serving an access collection template, for example, a screen or interface to the nomadic device where the screen or interface is consonant with the schema and metadata of the underlying database 112. The data is collected 47 while locking other users out of the file. The updated data file is then checked in to the data server 48, and the file is opened up for access by other users.

As shown in FIG. 3, a user receives an access collection template to access the data base. This is ready for initial check out, and must be done to associate a user's access with a proper engagement. The user selects check-out and is prompted for an authentication sign in ID. Once authentication and authorization are confirmed the user is presented with selection options to which the user is authorized.

The user selects the client, the engagement, the components and/or elements which can be checked out. The user checks out component elements from within the items that the user's group can accomplish, that is:
  Individually by component type.
  All elements within a component type.
  All elements of every component type to which the user's group is authorized.

The user then confirms checkout, and check out is accomplished. At this point the user is ready to start collecting data and adding data to the checks out elements or components, e.g., files.

After data collection is completed the user checks in the file. In this process the user selects "Check-In" and is prompted for authentication sign-in id. Once authenticated and authorization is confirmed the user is presented with confirmation of check-in. Check in confirmation provides a mechanism for loading data and keeping data in a check-out state. Once a user confirms check-in the check-in the check in into lading tables is accomplished.

In order to avoid corruption of data, if a user selects to keep checked-out data in a checked-out status, the data remaining in access must appear as if it had just been check out. This includes resetting of the columns, flags, bits, words, and indicators.

Another interaction is Release Check Out. This option would be used where a user had incorrectly or inadvertently checked out files, and wishes to check them back in without making any changes. In this case the user selects release check-out and is prompted for her authentication id. Once authenticated and authorization confirmed, the user is presented with a first confirmation of release check-out. If the first confirmation is affirmative, a second confirmation reminds the user that all changes or additions will be lost. If the user accepts the confirmation, the check-in is complete.

The invention may be implemented, for example, by having the method for nomadic data collection and management with pessimistic locking of data executed as a software application, in a general purpose processor, in a dedicated processor, or in a dedicated processor with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for securing and accessing digital data as a software application.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method of managing a nomadic data system, wherein the nomadic data system comprises a central data repository and nomadic data devices, and wherein updating a data element associated with the central data repository by a nomadic data device, the method comprises:
  authorizing the nomadic data device to access a data element in the central data repository;
  checking out the data element to the authorized nomadic data device, while locking the data element to other nomadic data devices, wherein locking the data element prevents the other nomadic data devices from accessing the data element that has been checked out to the authorized nomadic data device;
  disconnecting the authorized nomadic data device from the central data repository to indicate to the other nomadic data devices that the authorized nomadic data device is locally working with the checked out data element at the authorized nomadic data device;
  collecting updated data for the data element from the authorized nomadic data device, wherein the updated data was generated at the authorized nomadic data device while the data element was locked out to the other nomadic data devices and while the authorized nomadic data device was disconnected from the central data repository;
  receiving a release check out signal from the authorized nomadic data device, wherein the release check out signal indicates that specific items of data are being checked back in to the central data repository without any changes;
  in response to receiving the release check out signal, sending a confirmation signal to the authorized nomadic data device, wherein the confirmation signal alerts the authorized nomadic data device that any changes made to the specific items of data while checked out to the authorized nomadic data device will be lost;
  checking the specific items of data back in to the central data repository in response to the authorized nomadic data device accepting the confirmation signal;
  creating a client definition;
  creating an engagement definition;
  creating an authorization profile;

creating a group profile;
creating a user entry and assigning the user entry to a specific group within a single engagement;
checking out an access collection to a user that meets the client definition, the engagement definition, the authorization profile, and the group profile, while locking other users out of the access collection; and
checking in an updated data file to the access collection, wherein the updated data file was generated at the authorized nomadic data device while the data element was locked out to the other nomadic data devices.

2. The method of claim 1, further comprising authorizing access to the authorized nomadic data system for specific data from the central data repository by:
creating a client definition;
creating an engagement definition, said engagement definition being tied to a specific client;
creating authorization profiles tied to specific engagements;
creating group profiles assigned to specific authorization profiles; and
granting the authorized nomadic data device access only to data in the central data repository that is authorized for use by the specific client, the specific engagements, and the group profiles assigned to the specific authorization profiles.

3. The method of claim 2, further comprising checking out a data element to the authorized nomadic data device by:
locking other users out of the specific data file served to the authorized nomadic data device; and
serving an access collection template to the authorized nomadic data device while the other users are locked out from accessing the specific data file.

4. The method of claim 3, wherein the access collection template comprises an interface to the authorized nomadic data device, and wherein the interface is consonant with schema and metadata of the central data repository.

5. The method of claim 1, further comprising collecting updated versions of the data element from other authorized nomadic data devices while locking other unauthorized nomadic data devices out of the data element, checking the updated data element into a data server that handles the central data repository, and opening the data element for access by said other unauthorized nomadic data devices only after the data element is checked back in to the central data repository from all authorized nomadic data devices.

6. A nomadic data system comprising a central data repository adapted to exchange data with nomadic data devices that update data in the central data repository, the nomadic data system comprising:
a data server for managing the central data repository, the data server comprising a processor to perform operation of:
authorize access from a nomadic data device to the nomadic data system and to data in the central data repository;
check out data elements from the data system to the nomadic data device, while locking the data element to other nomadic data devices;
disconnect the authorized nomadic data device from the central data repository to indicate to the other nomadic data devices that the authorized nomadic data device is locally working with the checked out data element at the authorized nomadic data device;
collect updated data for the data elements from the authorized nomadic data device, wherein the updated data was generated at the authorized nomadic data device while the data element was locked out to the other nomadic data devices;
receive a release check out signal from the authorized nomadic data device, wherein the release check out signal indicates that specific items of data are being checked back in to the central data repository without any changes;
in response to receiving the release check out signal, send a confirmation signal to the authorized nomadic data device, wherein the confirmation signal alerts the authorized nomadic data device that any changes made to the specific items of data while checked out to the authorized nomadic data device will be lost;
check the specific items of data back in to the central data repository only if a user of the authorized nomadic data device returns an acceptance that acknowledges terms of the confirmation signal; create a client definition;
create an engagement definition;
create an authorization profile;
create a group profile;
create a user entry and assigning the user entry to a specific group within a single engagement;
check out an access collection to a user that meets the client definition, the engagement definition, the authorization profile, and the group profile, while locking other users out of the access collection; and
check in an updated data file to the access collection, wherein the updated data file was generated at the authorized nomadic data device while the data element was locked out to the other nomadic data devices.

7. The nomadic data system of claim 6, wherein the data server is further adapted to authorize access to the nomadic data system and to the central data repository by:
creating a client definition;
creating an engagement definition, said engagement definition being tied to a specific client;
creating authorization profiles tied to specific engagements;
creating group profiles assigned to specific authorization profiles; and
authorizing the authorized nomadic data device access only to data in the central data repository that is authorized for use by the specific client, the specific engagements, and the group profiles assigned to the specific authorization profiles.

8. The nomadic data system of claim 7, wherein the data server is further adapted to check out a data element to a nomadic data device by:
locking other users out of the specific data file served to the nomadic data device; and
serving an access collection template to the nomadic data device while the other users are locked out.

9. The nomadic data system of claim 8, wherein the access collection template comprises an interface to the nomadic data device, and wherein the interface is consonant with schema and metadata of the central data repository.

10. The nomadic data system of claim 6, wherein the data server is further adapted to collect data from the nomadic data device while locking other nomadic data devices out of the data element, checking the updated data file into the data server, and opening the data element for access by other nomadic data devices.

* * * * *